United States Patent [19]

Waggoner

[11] Patent Number: 4,639,495

[45] Date of Patent: Jan. 27, 1987

[54] EXTRUDING PROCESS FOR PREPARING FUNCTIONALIZED POLYOLEFIN POLYMERS

[75] Inventor: Marion G. Waggoner, Hockessin, Del.

[73] Assignee: E. I. Du Pont de Nemours and Company, Wilmington, Del.

[21] Appl. No.: 485,005

[22] Filed: Apr. 14, 1983

Related U.S. Application Data

[63] Continuation of Ser. No. 333,177, Dec. 21, 1981, abandoned.

[51] Int. Cl.⁴ .......................................... C08F 255/02
[52] U.S. Cl. ...................................... 525/285; 525/301
[58] Field of Search .............................. 525/285, 301

[56] References Cited

U.S. PATENT DOCUMENTS

| | | | |
|---|---|---|---|
| 3,177,269 | 4/1965 | Nowak et al. | 260/878 |
| 3,256,362 | 6/1966 | Craubner et al. | 260/862 |
| 3,261,885 | 7/1966 | Craubner et al. | 260/857 |
| 3,267,173 | 8/1966 | Zeitlin | 260/878 |
| 3,270,090 | 8/1966 | Nowak | 260/877 |
| 3,553,176 | 1/1971 | Fujisaki et al. | 260/78.4 |
| 3,830,888 | 8/1974 | King | 260/876 |
| 3,862,265 | 1/1975 | Steinkamp et al. | 260/878 |
| 3,862,266 | 1/1975 | McConnell et al. | 260/878 |
| 3,949,019 | 4/1976 | Zeitler | 525/301 |
| 3,953,655 | 4/1976 | Steinkamp et al. | 428/474 |
| 4,105,709 | 8/1978 | Iwami et al. | 260/857 |
| 4,134,927 | 1/1979 | Tomoshige | 525/301 |
| 4,174,358 | 11/1979 | Epstein | 525/183 |

FOREIGN PATENT DOCUMENTS 1042178  11/1966  United Kingdom .

*Primary Examiner*—Paul R. Michl

[57] ABSTRACT

An extruder process for grafting ethylenically unsaturated monomers onto polyolefin polymers through the use of peroxide initiators without evidencing degradation of the base polymer whereby the components are concurrently melted and homogeneously mixed in an intensive mixing zone of an extruder, passed into a reduced pressure zone to remove excess monomer and passed through the remainder of the extruder process.

4 Claims, No Drawings

EXTRUDING PROCESS FOR PREPARING FUNCTIONALIZED POLYOLEFIN POLYMERS

This is a continuation of application Ser. No. 333,177, filed Dec. 21, 1981, abandoned.

BACKGROUND OF THE INVENTION

The subject invention relates to the grafting of ethylenically unsaturated monomers to polyolefin polymers through the use of peroxide initiators. The resulting functionalized polyolefin polymers are useful as modifiers for, inter alia, polyamide resins.

It is known in the art that unsaturated monomers can be grafted to polyolefin polymers by addition of a peroxide initiator and monomer to molten polymer in a reduced pressure zone of a single screw extruder. The resulting grafted polymer shows appreciable degradation evidenced by an increase in the melt flow rate or melt index of the copolymer as compared to the base polymer. For example, U.S. Pat. No. 3,862,265 assigned to Exxon Research and Engineering Co. discloses, as a critical aspect of the process, highly intensive mixing in an extremely short period of time by melting the polymer before adding the monomer and initiator.

In an effort to reduce the degradation of the polymer, U.S. Pat. No. 3,177,269 assigned to Dow Chemical Company, discloses, after adding monomer and peroxide initiator to a molten polyolefin, "malaxing" the mixture in an extruder to such a low degree that no degradation takes place.

SUMMARY OF THE INVENTION

The subject invention is a process for preparation of functionalized polyolefin polymers in an extruder system whereby there is no degradation of the polymer.

More specifically, the subject invention is a process for the preparation of high molecular weight functionalized polyolefin polymers comprising concurrently heating to 200°–350° C. and homogeneously mixing a blend of a polyolefin having 2 to 8 carbon atoms, 0.1 to 10 weight percent of an $\alpha,\beta$ ethylenically unsaturated monomer and 0.05 to 2.0 weight percent of an organic peroxide initiator in an intensive mixing zone of an extruder for a time sufficient to graft the monomer onto the polyolefin so that 0.1 to 3.0 weight percent of the grafted polyolefin is monomer; passing the mixture into a reduced pressure zone as compared to the intensive mixing zone and removing any excess monomer therefrom; and passing the mixture through the remainder of the extruder process.

DETAILED DESCRIPTION

The subject invention is a process for the preparation of functionalized polyolefin polymers without degradation of the base polymer as evidenced by a resulting melt flow rate essentially equal to that of the base polymer. These high molecular weight polymers are especially useful modifiers for other polymers such as those polyamides described in U.S. Pat. No. 4,174,358 assigned to E. I. du Pont de Nemours and Company.

The process grafts modifying monomers onto polyolefin polymers having two to eight carbon atoms including copolymers of olefins with other monomers, such as vinyl monomers, in which the predominate constituent is the olefinic portion. These polymers may also have substitutions of functional hydroxy or amine groups. An exemplary list of eligible polyolefins include polyethylene, polypropylene, ethylene/methyl acrylate copolymer, ethylene/ethyl acrylate copolymer, ethylene/propylene copolymer, and ethylene/propylene/diene monomer copolymers such as ethylene/propylene/hexadiene. Ungrafted, these polyolefins, admixed with nylon, do not evidence nylon toughening. When grafted with the modifying monomers described below, however, such nylon toughening is evidenced.

As detailed in U.S. Pat. No. 3,862,265, herein incorporated by reference, the modifying monomers useful in the process of the subject invention include unsaturated mono- and polycarboxylic-containing acids ($C_3$–$C_{10}$) with preferably at least one olefinic unsaturation, and anhydrides, salts, esters, ethers, amides, nitriles, thiols, thioacids, glycidyl, cyano, hydroxy, glycol, and other substituted derivatives from said acids.

Also as detailed in U.S. Pat. No. 3,862,265, the grafting reaction is initiated by a free-radical initiator which is preferably an organic peroxy compound such as t-butyl perbenzoate, dicumyl peroxide, 2,5-dimethyl-2,5-di-tertbutylperoxy-3-hexyne, and $\alpha,\alpha'$-bis(tertbutylperoxy)diisopropyl benzene.

The grafting process of the subject invention is carried out in any conventional twin screw or single screw extruder capable of melting and homogeneously mixing the components of the process in less than about 30 seconds. If the melting and mixing is prolonged for a time longer than about 30 seconds, the initiator decomposes to such a degree that it no longer is effective as a grafting initiator.

Therefore, the polyolefin, 0.1 to 10 weight percent of monomer and 0.05 to 2.0 weight percent of initiator are concurrently heated to between 200 and 350° C. and homogeneously mixed in from 5 to 30 seconds in an intensive mixing zone of, for example, a twin screw extruder comprised of at least one kneading element followed by at least one element with reverse pitch as compared to the normal conveying elements therein, resulting in a grafted polyolefin wherein 0.1 to 3.0 weight percent of the grafted polyolefin is monomer. A reverse pitch element in conjunction with a kneading element holds the polymer melt in the intensive mixing zone to effectuate the desired grafting with, surprisingly, no polymer degradation.

The mixture is then passed into a reduced pressure zone wherefrom any excess monomer is drawn, generally requiring a retention time therein of at least 20 seconds. This reduction in pressure, fully detailed in U.S. Pat. No. 3,862,265, can be accomplished by providing an increase in the diameter of the extrusion chamber in conjunction with a venting means and/or a vacuum means. Finally, the mixture is passed through the remainder of the extrusion process, generally out of a die.

This process eliminates the inconvenience of prior art processes whereby the monomer and initiator were necessarily added to the polyolefin after the polyolefin was melted, while at the same time maintaining the molecular weight of the polyolefin, evidenced below by the melt flow rate of the polymer remaining substantially the same, and in fact, in some cases decreasing slightly.

Once formed, the functionalized polyolefin polymers of the subject invention can be isolated and blended with, for example, polyamide polymer in extruder processes well known in the art. Alternatively, the polymers of the subject invention can be passed from the reduced pressure zone into a zone whereinto is added a polyamide polymer, such polyamide melted therein and mixed with the polymers of the subject invention.

The subject invention will be more fully appreciated by reference to the Example that follows.

EXAMPLE for at least one hour at 200° C. with a nitrogen purge to remove any residual unreacted monomer, and comparing the infrared absorbance of the functional group in the final polymer versus those for known concentrations. The results are tabulated as follows (For comparison purposes, the melt flow of ungrafted "Nordel" 2744 is 0.135 g/10 min.):

TABLE

| Composition Number | Fumaric Acid (wt % based on polymer) | Peroxide (wt % based on polymer) | Screw Speed (RPM) | Minimum Retention Time in Intensive Mixing Zone (sec) | Melt Temperatures at Die (°C.) | Wt. % Monomer (based on grafted polymer) | Melt Flow (g/10 min.) |
|---|---|---|---|---|---|---|---|
| 1 | 3.0 | 0.6 "Dicup" 40 KE | 200 | 8.5 | 328° | 0.95 | 0.026 |
| 2 | 3.0 | 1.0 "Dicup" 40 KE | 200 | 8.5 | 326° | 1.07 | 0.001 |
| 3 | 1.0 | 1.0 "Dicup" 40 KE | 200 | 8.5 | 322° | 0.63 | 0.050 |
| 4 | 1.0 | 0.3 "Vulcup" 40 KE | 156 | 13.0 | 310° | 0.18 | 0.035 |

Compositions as tabulated below were prepared at about 260° C. in a 28 mm Werner & Pfleider (W & P) twin-screw extruder with an intensive mixing zone comprised of conventional conveying elements, one right hand staggered kneading element (W & P element #8028/0037-305/045) followed by one left hand (reverse) pitch element (W & P element #8028/0061-024/016), a low pressure zone with venting means to extract excess monomer, and a die. The polymer in compositions 1 through 9 was a commercial ethylene, propylene, diene copolymer rubber sold by E. I. du Pont de Nemours and Company as "Nordel" 2744, while the polymer of compositions 10 and 11 was linear high density polyethylene sold by Du Pont as "Alathon" 7030 and ethylene/ethyl acrylate sold by Union Carbide under code DPDA-9169 NT respectively. The monomer was fumaric acid and the peroxide in compositions 1 through 8 and 11 was "Dicup" 40KE sold by Hercules, Inc., a dicumyl peroxide supported on clay at about 40 weight percent active ingredient, while the peroxide in compositions 9 and 10 was "Vulcup" 40KE, also sold by Hercules, Inc., with a 40 weight percent α, α'-bis(t-butylperoxy)diisopropylbenzene supported on 60 weight percent clay.

As the compositions exited the die slot, they were quenched in an ice bath and cut into pellets with a coventional strand cutter. These samples were characterized by melt flow determined using ASTM D1238 at 230° C. with a load of 2160 g.

A substantial portion of the grafted acid was converted to anhydride during the extrusion step, therefore, the weight percent of monomer based on grafted polyolefin was calculated on the basis of maleic anhydride plus fumaric acid. This quantity was determined using samples prepared by heating the grafted polymer

I claim:

1. A process for the preparation of functionalized polyolefin polymers comprising:
   (i) concurrently heating to 200°–350° C. and homogeneously mixing a blend of a polyolefin having 2 to 8 carbon atoms, said polyolefin being at a temperature below its melting point prior to said heating, 0.1 to 10 weight percent of an α,β ethylenically unsaturated monomer and 0.05 to 2.0 weight percent of an organic peroxide initiator in an intensive mixing zone of an extruder for a time sufficient to graft the monomer onto the polyolefin such that 0.1 to 3.0 weight percent of the grafted polyolefin consists of the monomers;
   (ii) passing the mixture into a reduced pressure zone as compared to the intensive mixing zone and removing any excess monomer therefrom; and
   (iii) passing the mixture through the remainder of the extruder.

2. The process of claim 1 wherein step (i) is carried out in between 5 and 30 seconds.

3. The process of claim 1 wherein the extruder is a twin screw extruder and the intensive mixing zone is comprised of conventional conveying elements, at least one kneading element and at least one element with reverse pitch as compared to the normal conveying elements.

4. The process of claim 1 wherein the monomer is an unsaturated mono- or polycarboxylic-containing acids ($C_3$–$C_{10}$) with at least one olefinic unsaturation, and anhydride, salt, ester, ether, amide, nitrile, thiol, thio acid, glycidyl, cyano, hydroxy and glycol derivatives of said acids.

* * * * *